March 21, 1950     M. A. GARBELL     2,501,504
APPROACH LIGHTING SYSTEM FOR AIRCRAFT RUNWAYS
Filed Oct. 27, 1949
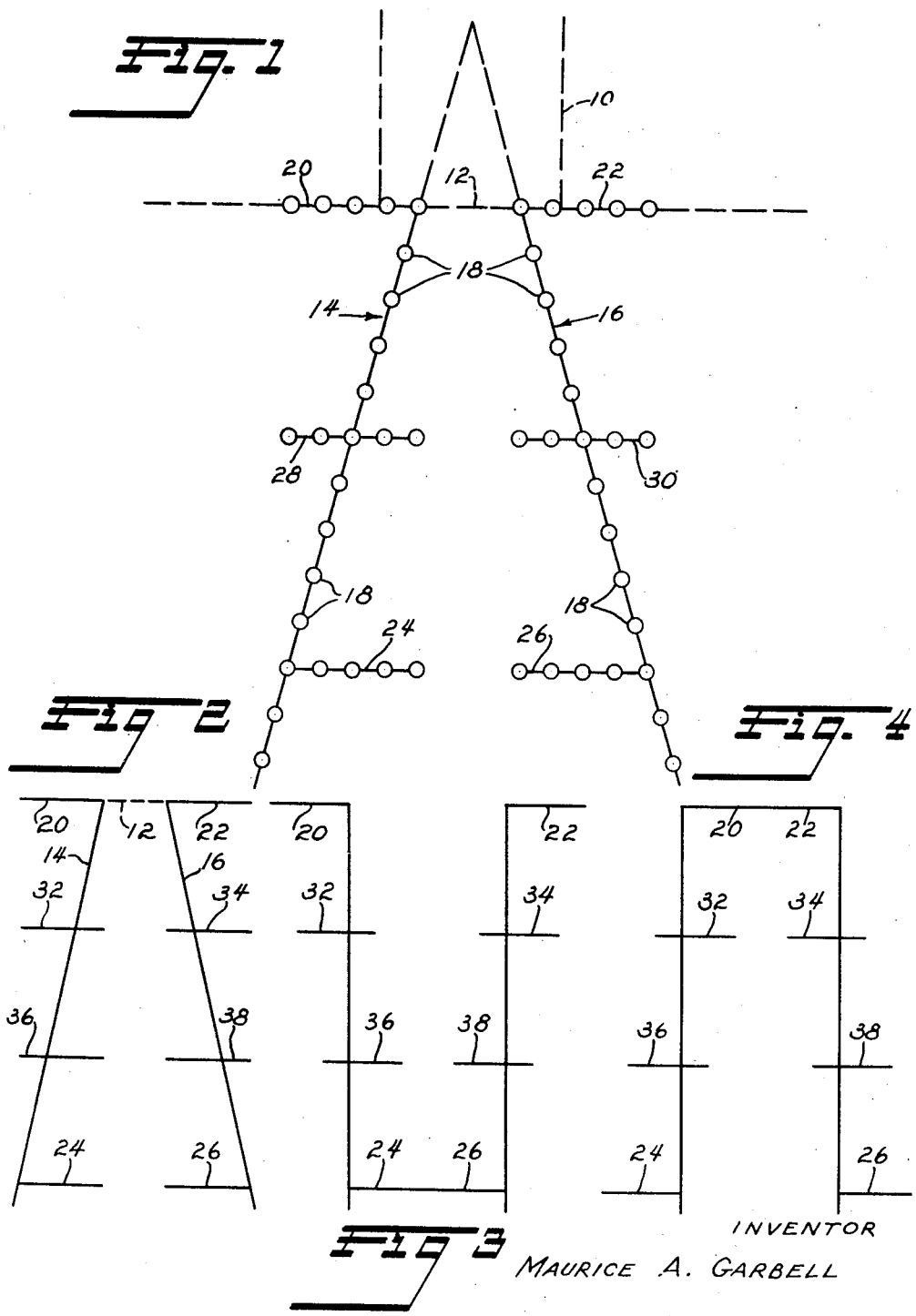
INVENTOR
MAURICE A. GARBELL
Scrivener & Parker
ATTORNEYS Patented Mar. 21, 1950

2,501,504

UNITED STATES PATENT OFFICE 2,501,504

APPROACH LIGHTING SYSTEM FOR AIRCRAFT RUNWAYS

Maurice A. Garbell, San Francisco, Calif.

Application October 27, 1949, Serial No. 123,883

6 Claims. (Cl. 177—352)

1

This invention relates to lighting systems for the approach zones of aircraft runways, and more particularly to an approach-lighting arrangement for indicating to the pilot of an aircraft the longitudinal distance to the runway threshold or other predetermined point on the runway, as well as to aid him in assessing visually the attitude in roll or bank of his aircraft.

The principal object of the present invention is to facilitate the landing of aircraft by providing a new and improved approach-lighting system which is so arranged as to visibly present a change of configuration or pattern of lights as the craft approaches the runway so as to clearly indicate the longitudinal distance between the aircraft and the runway threshold while providing also a simulated representation of the natural horizon.

A further object is to coordinate the approach-lighting system of the present invention with the rows of approach lights as currently used in certain airports, in order to secure a highly efficient longitudinal guidance, as well as roll or bank guidance, of approaching aircraft without disturbing the existing airport lighting facilities.

The above stated and other objects and novel features of the invention will appear more fully hereinafter from the following detailed description when taken in connection with the accompanying drawing, which illustrates several forms of the invention. It is to be expressly understood, however, that the drawing is utilized for purposes of illustration only and is not designed as a definition of the limits of the invention, reference being had for this latter purpose to the appended claims.

In the drawing, wherein similar reference characters refer to similar parts throughout the several views:

Fig. 1 is a diagrammatic plan view of an approach-lighting system for aircraft runways arranged in accordance with the present invention, and Figs. 2, 3 and 4 are diagrammatic plan views of modified forms of the invention.

Referring more particularly to Fig. 1, the airport approach-lighting system of the present invention is therein illustrated in connection with an aircraft runway 10 having a threshold 12 and equipped with a two-row system of approach lighting, each row 14 and 16 comprising a line or row of spaced-apart light units 18, each of which may consist of one or more individual luminous sources, and each of which is arranged as to be clearly visible to the aircraft pilot. As

2 shown in Figs. 1 and 2, approach-light rows 14 and 16 are arranged in converging relation, while in Figs. 3 and 4, the rows 14 and 16 are arranged parallel to each other. The invention is applicable to either, or any equivalent, fundamental approach-light pattern, as will be clearly understood from the following.

The essence of the invention is to provide a changing light pattern or configuration as the runway is approached in order to indicate to the aircraft pilot, at any point of his visual approach, the longitudinal distance to a predetermined point on the runway, such as the threshold, for example, while simultaneously providing the necessary guidance in roll or bank. This is achieved in the configuration shown in Fig. 1 by providing a plurality of pairs of substantially horizontal transverse bars or lines of spaced-apart lights which are so associated with the rows of approach lights 14 and 16 as to secure the aforesaid variation in the visual appearance of the light pattern as the aircraft approaches the runway 10. More particularly, a pair of aligned transverse light bars 20 and 22 are arranged at or adjacent to the runway threshold 12, each of the bars comprising a line of elongated or spaced-apart punctiform light sources, preferably white or green, and extending from the approach light rows 14 and 16 outwardly in opposite directions. Positioned at a selected distance from the runway threshold 12, a second pair of aligned transverse light bars 24 and 26, preferably white, are positioned to extend from the approach-light rows 14 and 16 inwardly toward each other and parallel to the transverse bars 20 and 22. A third set of aligned transverse light bars 28 and 30, preferably white, is arranged intermediate of and parallel to the pairs of bars 20—22 and 24—26 and as shown, the transverse bars of the third set are positioned so as to extend on opposite sides of the respective approach-light rows 14 and 16.

From the foregoing, it will be readily understood that owing to the symmetrical but varying arrangement of the pairs of transverse light bars 20—22, 24—26, and 28—30, a varying light pattern will present itself to the pilot as the aircraft approaches the runway 10 in order to signal longitudinal guidance, while the substantially horizontal alignment of each respective pair of transverse light bars will provide roll or bank guidance. Preferably, the pattern is so arranged as to impart pre-established, standardized and generally understood distance information. For example, in Fig. 1, the longitudinal distance between the pairs of transverse bars 20—22 and 24—26 may be two thousand feet, while the distance between the pairs 20—22 and 28—30 may be one thousand feet. Thus the pilot, knowing the distances between the pairs of transverse bars, and observing the varying light patterns, resulting from the herein described combination thereof with the longitudinal rows of approach lights, as the aircraft approaches the runway, may operate the necessary controls of the aircraft and its powerplant so as to effect a safe landing on runway 10.

While Fig. 1 includes only a single pair of intermediate transverse light bars 28 and 30, it will be readily understood that additional pairs of intermediate transverse bars may be utilized, if desired. For example, Fig. 2 diagrammatically shows an arrangement similar to that of Fig. 1, except that two pairs of intermediate transverse light bars 32—34 and 36—38 are provided. As shown, the transverse light bars of the pairs 32—34 and 36—38 progressively extend toward each other a further distance from the respective approach-light rows 14 and 16, with the most remote transverse bars 24 and 26 extending inwardly only from the said approach-light rows 14 and 16 toward each other. Here again, the lighting pattern for each longitudinal station, as represented by the respective position of each pair of transverse lighting bars, will be distinctive and will clearly signal its respective distance from the runway threshold.

Figs. 3 and 4 illustrate further forms of the invention which may be utilized with approach-lighting systems wherein the longitudinal approach-light rows 14 and 16 are parallel to one another rather than convergent. In Fig. 3, the pairs of transverse light bars 20—22, 24—26, 32—34 and 36—38 are arranged with respect to the approach-light rows 14 and 16 in the same manner as in Fig. 2, except that the bars 24 and 26 may be arranged to present a substantially unbroken single line of lighting. Fig. 4 is similar to Fig. 3, except that the transverse-bar arrangement is reversed, being open in the outermost pair of transverse bars 24 and 26 and being substantially closed in the pair of transverse bars 20 and 22 at or near the runway threshold 12.

While it is preferred that all of the transverse light bars heretofore described be of the same length, it will be obvious that, if desired, they may be progressively shorter or longer and hence proportional to the distance from a predetermined point on the runway. In this manner, the different lengths of the transverse bars will serve to give additional information as respects the longitudinal distance to the runway threshold 12 or other selected point on the runway.

While several forms of the invention have been illustrated and described herein, it will be readily understood by those skilled in the art that variations or modifications may be resorted to without departing from the spirit of the invention. Reference will therefore be had to the appended claims for a definition of the limits of the invention.

What is claimed is:

1. An approach lighting system for an aircraft runway for indicating longitudinal distance to the runway threshold, comprising a pair of longitudinally positioned spaced-apart rows of lights arranged externally of the runway and extending from said threshold to a pre-established distance from said threshold, each of said rows comprising spaced-apart light units having a selected maximum width, and a plurality of pairs of aligned light bars arranged symmetrically with respect to said longitudinal rows of lights, the length of all of said bars exceeding the maximum width of said light units, the light bars of one pair being positioned substantially at the runway threshold with corresponding ends thereof positioned substantially coincident with said rows and extending symmetrically in opposite directions from said rows, the other pairs of light bars being parallel with said one pair and respectively positioned at different distances from said threshold, the light bars of the most remote pair having corresponding ends thereof positioned substantially coincident with said rows and extending from said rows in symmetrically opposite directions which are in the opposite sense to the first named directions, and at least one pair of intermediate light bars being positioned with the bars thereof extending on opposite sides of each respective row, the space between the respective light bars of all of said pairs including a plurality of said light units.

2. An approach-lighting system as set forth in claim 1 wherein the light bars of all of said pairs are of substantially equal length.

3. An approach-lighting system as set forth in claim 1 wherein the light bars of all of said pairs are substantially horizontal.

4. An approach lighting system for an aircraft runway for indicating longitudinal distance to the runway threshold, comprising a pair of longitudinally positioned spaced-apart rows of lights arranged externally of the runway and extending from said threshold to a pre-established distance from said threshold, each of said rows comprising spaced-apart light units having a selected maximum width, and a plurality of pairs of aligned light bars arranged symmetrically with respect to said longitudinal rows of lights, the length of all of said bars exceeding the maximum width of said light units, the light bars of one pair being positioned substantially at the runway threshold with corresponding ends thereof positioned substantially coincident with said rows and extending outwardly in symmetrically opposite directions from said rows, the other pairs of light bars being parallel with said one pair and respectively positioned at different distances from said threshold, the light bars of the most remote pair having corresponding ends thereof positioned substantially coincident with said rows and extending inwardly from said respective rows toward each other, and at least one pair of intermediate light bars being positioned with the bars thereof extending on opposite sides of the respective rows, the space between the respective light bars of all of said pairs including a plurality of said light units.

5. An approach lighting system for an aircraft runway for indicating longitudinal distance to the runway threshold, comprising a pair of longitudinally positioned spaced-apart rows of lights defining an approach axis, said rows arranged externally of the runway and extending from said threshold to a pre-established distance from said threshold, each of said rows comprising spaced-apart light units having a selected maximum width, and a plurality of pairs of aligned light bars arranged symmetrically with respect to said longitudinal rows of lights, the length of all of said bars exceeding the maximum width of said light units, the first pair of aligned light bars being positioned substantially at the runway threshold with corresponding ends thereof positioned substantially coincident with said rows and extending outwardly from the said respective rows and away from said approach axis, a second pair of aligned light bars being positioned parallel with the first pair and at a pre-established distance from said first pair and with corresponding ends thereof positioned substantially coincident with said rows, the light bars of said second pair extending inwardly from the respective rows and toward said approach axis, and a third pair of aligned light bars positioned parallel with and between said first and second pairs, the light bars of said third pair extending on opposite sides of the respective rows, and the space between the respective light bars of all of said pairs including a plurality of said light units.

6. An approach lighting system for an aircraft runway for indicating longitudinal distance to the runway threshold, comprising a pair of longitudinally positioned spaced-apart rows of lights defining an approach axis, said rows arranged externally of said runway and extending from said threshold to a pre-established distance from said threshold, each of said rows comprising spaced-apart light units having a selected maximum width, and a plurality of pairs of aligned light bars arranged symmetrically with respect to said longitudinal rows of lights, the length of all of said bars exceeding the maximum width of said light units, the light bars of one pair being positioned substantially at the runway threshold with corresponding ends thereof coincident with said rows and extending inwardly from said respective rows toward each other and toward the approach axis, the other pairs of light bars being parallel with said one pair and respectively positioned at different distances from said threshold, the light bars of the most remote pair having corresponding ends thereof positioned substantially coincident with said rows and extending outwardly from said rows and away from said approach axis, and at least one pair of intermediate light bars being positioned with the bars thereof extending on opposite sides of the respective rows, the space between the respective light bars of all of said pairs including a plurality of said light units.

MAURICE A. GARBELL.

REFERENCES CITED

The following references are of record in the file of this patent:

UNITED STATES PATENTS

| Number | Name | Date |
|---|---|---|
| 1,998,429 | Andre et al. | Apr. 23, 1935 |
| 2,212,537 | Coulter | Aug. 27, 1940 |

OTHER REFERENCES

Av. Aer. Journal, April 1, 1940, page 111.
Aviation Week, May 31, 1948, pp. 18, 21-25.